No. 819,486. PATENTED MAY 1, 1906.
M. WILLETT.
AGRICULTURAL APPLIANCE.
APPLICATION FILED AUG. 7, 1905.

3 SHEETS—SHEET 1.

Witnesses Inventor
Marinus Willett
By Dickinson & Fisher
his Attorneys

No. 819,486. PATENTED MAY 1, 1906.
M. WILLETT.
AGRICULTURAL APPLIANCE.
APPLICATION FILED AUG. 7, 1905.
3 SHEETS—SHEET 2.
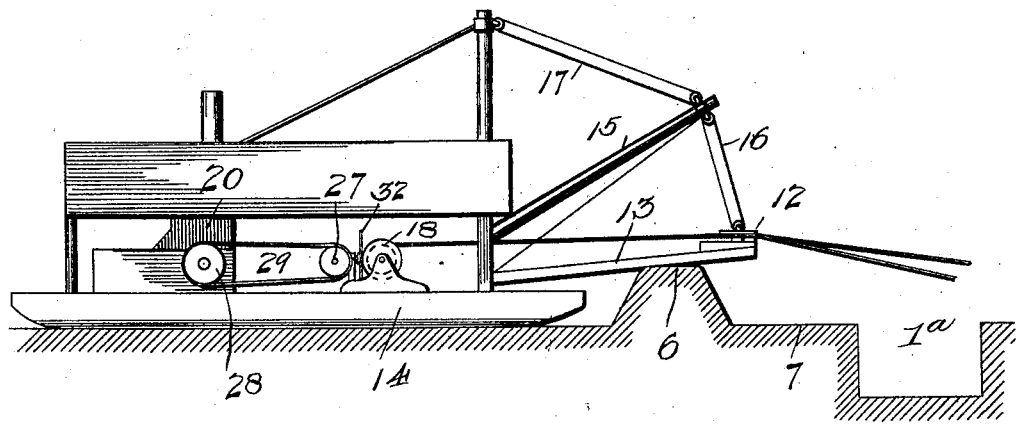
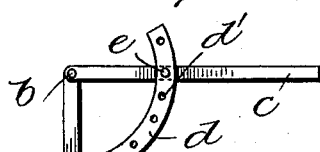
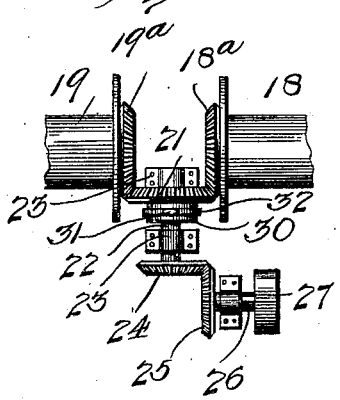
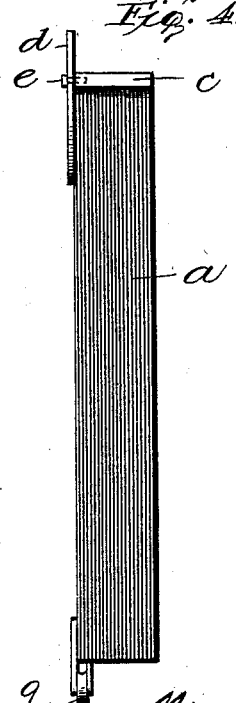
Witnesses
Inventor
Marinus Willett
By Wilkinson & Fisher
his Attorneys No. 819,486. PATENTED MAY 1, 1906.
M. WILLETT.
AGRICULTURAL APPLIANCE.
APPLICATION FILED AUG. 7, 1905.

3 SHEETS—SHEET 3.

Witnesses
Inventor
Marinus Willett
By Wilkinson & Fisher
his Attorneys

UNITED STATES PATENT OFFICE.

MARINUS WILLETT, OF BROOKGREEN, SOUTH CAROLINA.

AGRICULTURAL APPLIANCE.

No. 819,486.          Specification of Letters Patent.          Patented May 1, 1906.

Application filed August 7, 1905. Serial No. 273,146.

*To all whom it may concern:*

Be it known that I, MARINUS WILLETT, a citizen of the United States, residing at Brookgreen, in the county of Georgetown and State of South Carolina, have invented certain new and useful Improvements in Agricultural Appliances; and I do hereby declare the following to be a full, clear, and exact description of the invention, such as will enable others skilled in the art to which it appertains to make and use the same.

This invention relates to improvements in agricultural appliances, and is especially designed as a mechanical means, operated by steam, electricity, or other suitable motive power, for preparing fields for cultivation, and more particularly rice-fields, in which the field is laid off in beds with suitable ditches or drains for flooding same.

Broadly speaking, the invention consists in providing pulleys at one end of the field with a pair of removably-supported pulleys adapted to be anchored opposite each other on the sides of the fields at varied positions longitudinally thereof, associated with operating-cables, one end of which is adapted to be secured to the agricultural implement operating across the field and the other ends of which are secured to suitably-driven drums in such a manner that one of the cables is being wound on its drum while the other is being unwound.

A further object of the invention is to provide means whereby both of the cables may be simultaneously unwound from the drums in order that when the plow or other agricultural implement has been dragged across the fields the cables may be slackened to permit of the plow being skidded longitudinally of the field into operative position with respect to the next bed, it being understood, of course, that the supports for the second series of pulleys will be also shifted to their proper positions.

To more fully understand the invention, reference is had to the accompanying drawings, illustrating an application of the same, in which like characters designate the same parts in the several views, and in which—

Figure 1:
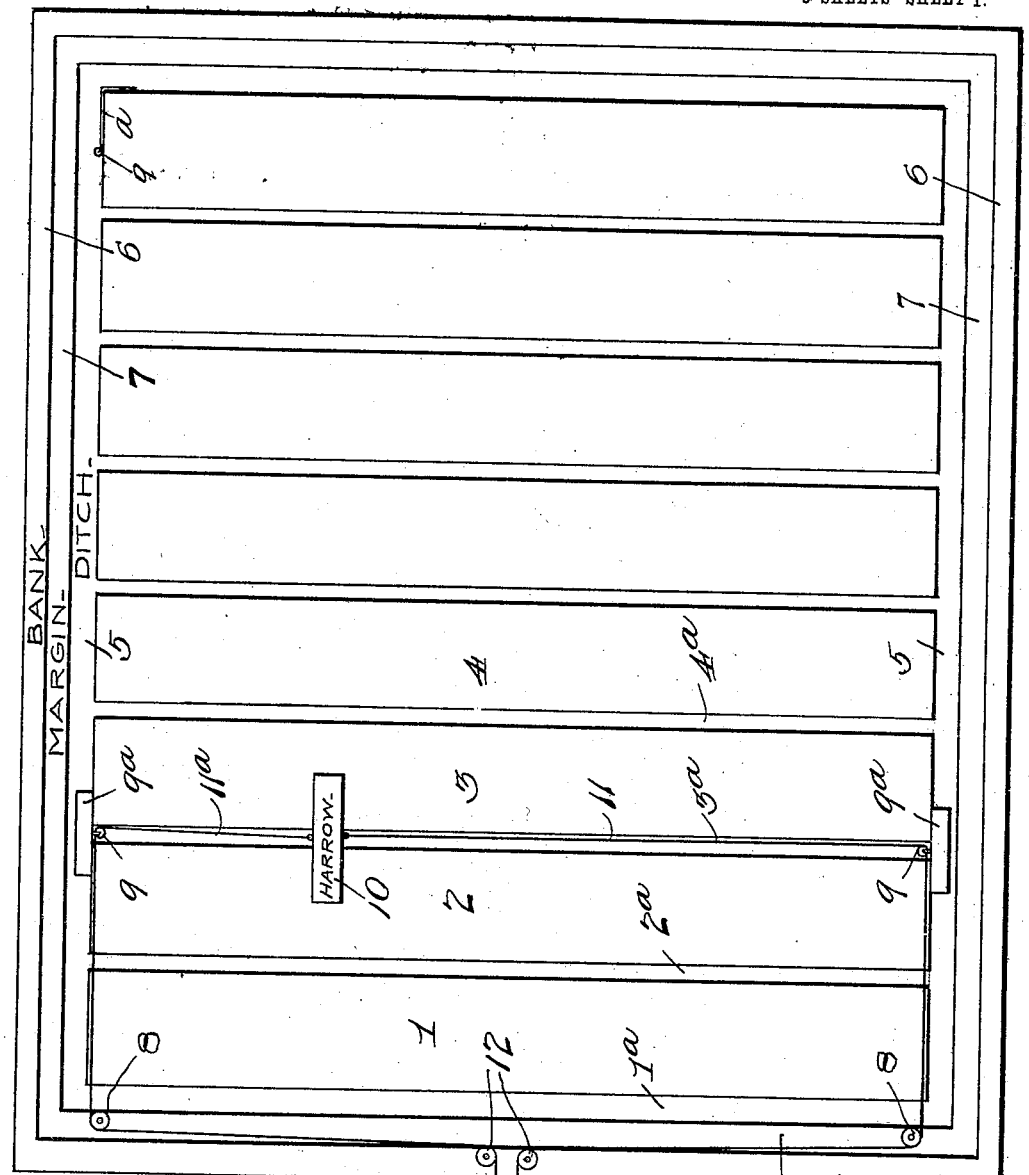
Figure 6:
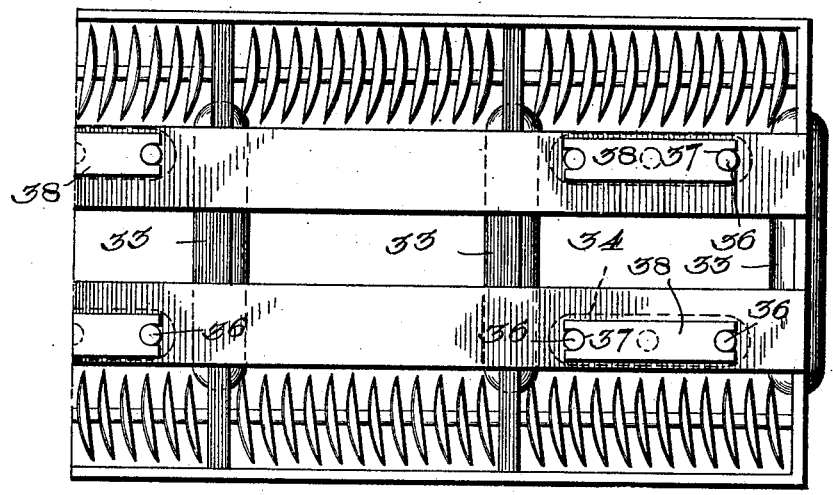

Figure 1 is a diagrammatic view of a rice-field laid off in beds, associated with my improved means for working same. Fig. 2 is a view illustrating a power-furnishing means in operative position at one end of the rice-field. Figs. 3 and 4 are views in plan and side elevation of a hinged angle-plate provided with a pulley and adapted to be suitably anchored at opposite ends of a bed. Fig. 5 is a fragmentary plan view of a suitable driving means for the operating-drums. Fig. 6 is a plan view of a disk harrow, illustrating one of a variety of agricultural implements which may be used in connection with the invention; and Fig. 7 is a side elevation of same.

Referring to Fig. 1, 1 2 3 4, &c., designate a series of beds, 1$^a$ 2$^a$ 3$^a$ 4$^a$, &c., being cross-drains or ditches separating the respective beds and communicating at their ends with the longitudinal or main drains or ditches 5. 6 designates an embankment formed around the field, leaving the margin 7 therearound. 8 represents anchored pulleys fixed at one end of the field at each side thereof, and these pulleys remain in this fixed or anchored position during the whole operation of working in one field. It might be stated here that for the purpose of convenience in the following description and claims by the term "fixed pulleys" I mean the pulleys 8, which are fixed with respect to the field, in contradistinction to the pulleys hereinafter referred to as "shiftable" pulleys, which are adapted to be moved longitudinally of the field and anchored at different positions therealong. 9 represents shiftable pulleys, illustrated in Fig. 1 as being mounted on floats 9$^a$, adapted to be floated along the longitudinal ditches or drains 5 to any desired points therealong and anchored in correlative positions, it being understood that while these longitudinal ditches and cross-drains are for the purpose of flooding and draining the fields the longitudinal ditches always have sufficient water therein to float the floats. 10 designates a harrow or other agricultural implement, and I use the term "agricultural implement" as broadly covering all classes of devices used in the preparation and treatment of the soil and the raising and collection of the crop. 11 11$^a$ are a pair of operating-cables suitably secured at one end, as by a hook connection, to the implement 10. In the drawings this is shown as a simple connection; but it is obvious that a suitable bridle or brace or other means might be used whereby the pulling strain will be equally distributed on the implement. The cables 11 11$^a$ reeve through their respective pulleys 9 8 and suitable pulleys 12, preferably mounted on the outrigged arms 13 of the support or drag 14, 15 designating a boom coöperating with the block-and-tackle connections 16 and 17 to elevate a swing around the outrigged arms 13 when desired. The ends of the cables 11 11ª after passing around the pulleys 12 are wound around the drums 18 and 19 in such a manner that when power is applied to the drums from a suitable source of power (indicated in the drawings as the engine 20) one cable will be unwound while the other is being wound up. It is desirable, however, for a purpose hereinafter referred to in the operation of the device, to provide suitable means whereby the cables may be simultaneously unwound from the drums, and in Fig. 5 there is illustrated in detail a simple means of accomplishing this end. In this construction the drums 18 and 19 are independently mounted and are provided on their inner ends with the beveled gears 18ª 19ª, adapted to mesh with the driving beveled gear 21. This gear 21 is mounted on a stud-shaft 22, supported in the journals 23, the opposite end of said stud-shaft being provided with a beveled gear 24, meshing with another beveled gear 25, mounted on the shaft 26, having the pulley 27 thereon, which pulley is connected with the driving-wheel 28 of the engine by a belt 29. It is obvious, however, that any preferred connection with the driving power may be employed and that the motive power may be other than a steam-engine. The beveled gear 21 is so mounted on the shaft 22 as to rotate therewith, but to be freely movable longitudinally thereof, this being accomplished by the usual spline-and-groove connection. The inside face of the gear 21 is provided with an annularly-grooved collar 30, to which is connected a lever 31, pivotally connected at its lower end to the support 14 and provided with a stirrup 32, loosely fitting within the annular groove of boss 30.

In Figs. 3 and 4 is shown a hinged corner-grip adapted to be anchored to the corners of the beds. One of these corner-plates is shown in Fig. 1 applied to a corner of one of the beds for the purpose of illustration. The purpose and object of these corner-plates is to provide land-anchored pulleys adapted to be secured directly to the beds as contradistinguished from the construction embodying the pulleys mounted on the shiftable floats 9ª, and these land-anchored pulleys may be a permanent fixture of the bed—that is to say, a corner-plate may be secured on each of the far corners of the several beds, or simply two of the corner-plates may be used for the several beds, in which case after each bed has been worked the corner-plates would have to be carried from the worked bed and anchored again in corresponding positions on the far corners of the next bed, the drums in the meantime having been thrown out of gear to allow the cables to unwind therefrom and furnish sufficient slack to permit of the removal of the corner-plates to the next bed to be worked. This corner-grip simply consists of the arm $a$, provided at one end with the pulley 9 and hinged at its other end, as at $b$, to a transverse arm $c$, $d$ designating a segment-plate fixed at one end to the arm $a$ and provided with a plurality of perforations $d'$ to receive a locking pin or bolt $e$, adapted to be secured to the arm $c$. By this construction it is apparent that ready means is provided for adjusting the angle-plate or corner-grip to the corner of the bed.

Figure 7:
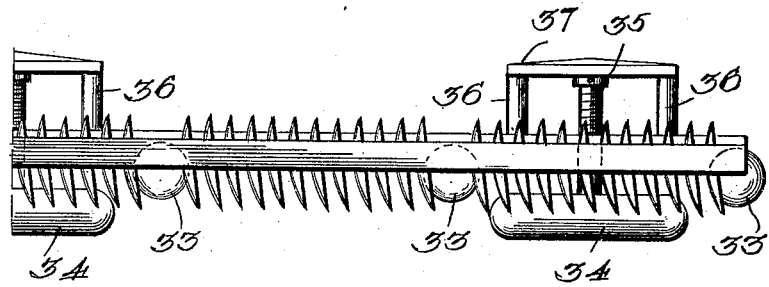

In Figs. 6 and 7 is shown a disk harrow representing one of the several agricultural implements before referred to in connection with my improvements and showing means for skidding the same along the ground. These implements are provided with transverse skids or runners 33 and the longitudinally-disposed skids 34. These latter skids 34 are preferably connected with the jacking-screw 35 36, designating guide-bars secured to the skids and riding through the end slots 37 in the top plates 38.

In operation, the implement being at one side of the field with the parts in the position shown in Fig. 1, upon power being applied the drums 18 and 19 are rotated in opposite directions, the cable 11 being wound up on its drum and the cable 11ª being unwound. When the implement has reached the right-hand side of the field, by means of the lever 31 the beveled gear 21 is thrown out of mesh with the beveled gears 18ª and 19ª, and the drums 18 and 19 are therefore made independently operative. The floats 9ª may then be floated along the drains 5 to their next position longitudinally of the field and again anchored. In this position the gear 21 may be again thrown into mesh with the gears 18ª and 19ª, and upon power being applied the implement will be skidded transversely of the end of the bed, on the longitudinal skids 34, to its operative position with respect to the next bed, it being understood, of course, that the said skids 34 have been jacked down to their operative position with the implement and the transverse skids 33 elevated above the ground. When the whole field has been worked, if desired, the harrow or other implement might be returned to the end of the field by connecting one of the operating-cables thereto, and the floats may also be brought back in this manner and hoisted aboard the support 14, which would be a convenient means for dragging them to another field.

While in Fig. 1 I have shown the harrow as operated on two adjacent beds, it is obvious that by shifting the floats to the proper relative position one bed may be worked independently of the other. It is also obvious that while I have described the invention as applied for use with agricultural implements proper it may also be used in connection with ditching or dredging machines for cleaning out the drains adjacent the beds. It is also obvious that changes might be made without departing from the spirit of the invention, and I do not limit myself to the exact details as described and illustrated.

What I claim is—

1. The combination with a pair of fixed pulleys and a pair of shiftable pulleys with means for anchoring the latter along the field, of an agricultural implement interposed between said shiftable pulleys, operating drums and gearing therebetween to normally rotate one of said drums in a direction the reverse of the other, cables fixedly connected at one of their ends to said agricultural implement and at their other ends so associated with said drums as to be reversely wound and unwound, and means operative to throw said drums out of gear and allow said cables to simultaneously unwind therefrom, substantially as described.

2. The combination with a pair of fixed pulleys and a pair of shiftable pulleys with means for anchoring the latter along the field, of an agricultural implement interposed between said shiftable pulleys, independently-mounted drums, cables connected at one end to said implement and at their other ends so associated with said drums as to be reversely wound thereon and unwound therefrom when said drums are in couple, power mechanism, and means for throwing said power mechanism and drums in and out of couple thereby permitting said cables to simultaneously unwind therefrom when said drums are out of couple, substantially as described.

3. In appliances for working fields having longitudinal drains, the combination with shiftable floats operating in said drains, pulleys mounted on said floats, an agricultural implement operative between said pulleys, fixed pulleys at one end of the field at opposite sides thereof, operating-drums, and cables connected at one of their ends to said agricultural implement, reeving through said pulleys and at their other ends so associated with said drums as to be reversely wound and unwound therefrom, and means for applying power to said drums substantially as described.

4. In appliances for working fields having longitudinal drains, the combination with shiftable floats operating in said drains, pulleys mounted on said floats, an agricultural implement operative between said pulleys, fixed pulleys at one end of the field at opposite sides thereof, operating-drums, and cables connected at one of their ends to said agricultural implement, reeving through said pulleys, and at their other ends so associated with said drums as to be reversely wound and unwound therefrom, power mechanism, and means for throwing said power mechanism and drums in and out of couple to permit said drums to simultaneously unwind and pay off said cables to secure a slack for shifting the position of said floats, substantially as described.

In testimony whereof I affix my signature in presence of two witnesses.

MARINUS WILLETT.

Witnesses:
H. M. GRIMBULL,
A. R. JOHNSON.